United States Patent
Kokkinen et al.

(10) Patent No.: US 6,831,894 B1
(45) Date of Patent: Dec. 14, 2004

(54) METHOD AND A SYSTEM FOR RESERVING TRANSMISSION CAPACITY

(75) Inventors: Heikki Kokkinen, Helsinki (FI); Matti Hahtala, Helsinki (FI)

(73) Assignee: Nokia Multimedia Terminals Oy, Helsinki (FI)

( * ) Notice: Subject to any disclaimer, the term of this patent is extended or adjusted under 35 U.S.C. 154(b) by 0 days.

(21) Appl. No.: 09/448,004

(22) Filed: Nov. 23, 1999

(30) Foreign Application Priority Data

Nov. 23, 1998 (FI) .................................................. 982530

(51) Int. Cl.$^7$ .............................................. H04L 12/26
(52) U.S. Cl. ...................................... 370/236; 370/468
(58) Field of Search ................................. 370/229, 230, 370/235, 236, 236.1, 328, 329, 345, 349, 395.2, 395.21, 432, 468

(56) References Cited

U.S. PATENT DOCUMENTS

| | | | | |
|---|---|---|---|---|
| 4,477,809 A | * | 10/1984 | Bose ........................ | 340/10.41 |
| 4,584,684 A | * | 4/1986 | Nagasawa et al. .......... | 709/237 |
| 5,684,791 A | | 11/1997 | Raychaudhuri et al. ..... | 370/278 |
| 5,727,002 A | | 3/1998 | Miller et al. .................. | 371/32 |
| 5,745,477 A | * | 4/1998 | Zheng et al. ................ | 370/230 |
| 5,903,735 A | * | 5/1999 | Kidder et al. ............... | 709/240 |
| 5,966,163 A | * | 10/1999 | Lin et al. ...................... | 725/117 |
| 6,002,690 A | * | 12/1999 | Takayama et al. .......... | 370/437 |
| 6,023,467 A | * | 2/2000 | Abdelhamid et al. .... | 370/236.2 |
| 6,137,779 A | * | 10/2000 | Miller et al. ................. | 370/236 |
| 6,157,614 A | * | 12/2000 | Pasternak et al. ........... | 370/236 |
| 6,208,653 B1 | * | 3/2001 | Ogawa et al. ......... | 370/395.52 |
| 6,314,110 B1 | * | 11/2001 | Chin et al. .................. | 370/468 |

FOREIGN PATENT DOCUMENTS

| | | |
|---|---|---|
| EP | 0681406 | 11/1995 |
| EP | 0722228 A2 | 7/1996 |
| FI | 102346 | 11/1998 |
| KR | 9504881 | 5/1995 |
| WO | 9714231 | 4/1997 |

* cited by examiner

*Primary Examiner*—Kwang Bin Yao

(57) ABSTRACT

The object of the invention is a method for reserving transmission capacity required by the acknowledgement and/or response messages (33) in a bi-directional transmission system, where a message (16) is transmitted from a first unit (12) to a second unit (13), the second unit (13) receives the message (16) transmitted by the first unit (12), and the second unit (13) transmits an acknowledgement and/or response message (33) as a response to the received message (16) so that the reservation of the transmission capacity required by the acknowledgement and/or response message (33) is made substantially in connection with the transmission of the message (16) transmitted from the first unit (12) to the second unit (13). An object of the invention is also a system for reserving transmission capacity required by the acknowledgement and/or response messages (16) in a bi-directional transmission system, whereby the transmission system comprises at least a first unit (12) having means for transmitting and receiving a message (16), and a second unit (13) for receiving the message (16) and for transmitting acknowledgement and/or response messages (33), and the first unit (12) and/or the second unit (13) have means for making the reservation of transmission capacity required by the acknowledgement and/or response message (16) substantially in connection with the transmission of a message (16) transmitted from the first unit (12) to the second unit (13).

10 Claims, 5 Drawing Sheets

METHOD AND A SYSTEM FOR RESERVING TRANSMISSION CAPACITY

BACKGROUND OF THE INVENTION

1. Technical Field

The invention relates to a method and system for reserving transmission capacity required by the acknowledgement and/or response messages in bi-directional transmission systems.

2. Discussion of Related Art

Many modern transmission systems use time division multiple access technology utilizing one available resource in order to transmit information which is obtained from several different sources. Such systems often include a so called point-to-multipoint architecture, a possibility to transmit packets in the form of bursts, and a centralized management of the transmission resource, such as a transmission channel. For instance transmission systems using the the Transmission Control Protocol (TCP) can be realized as systems of the mentioned type.

FIG. 1 shows a prior art solution based on the so-called reservation contest method for reserving transmission capacity in systems of the above-described kind. The transmission system 10 according to FIG. 1a consists of a transmission network 11 and four transmission units 12, 13, 14 and 15 connected to the network 11. When an information packet 16 shall be transmitted from the first unit 12 to the second unit 13 the information packet 16 is transmitted directly to the transmission network 11. If the transmission capacity of the network 11 is available the information packet 16 is conveyed from the first unit 12 to the second unit 13, as shown in FIG. 1a. If for instance the third unit 14 simultaneously tries to transmit another information packet 17, there occurs a so-called collision between the packets, as shown in FIG. 1b. In such a situation neither transmitted packet 16 and 17 will reach its destination.

When the first and third transmission units 12 and 14 detect the collisions, for instance by listening to the traffic in the network 11, they both wait a period of a random length, and then they try to re-transmit the packets 16 and 17. This is continued until the transmission of the packets succeeds without collisions.

When the above described reservation contest method is used it is natural that also the probability of collisions increases when the number of information packets moving in the network 11 increases. For instance, the theoretical maximum efficiency, or the throughput probability of the transmission, in the widely used slotted ALOHA reservation contest system is $1/e \approx 37\%$ [1] in a system with infinitely many users. This restricts the usefulness of reservation contest methods in congested networks.

FIG. 2 illustrates the use of the above described prior art reservation contest method in the transmission between the first and second transmission units 12 and 13, when the first unit 12 transmits information 16 which requires an acknowledgement (ACK) to the second unit 13. This is the case for instance in transmitting a simple information packet according to the TCP, because according to the TCP each received packet must be acknowledged, otherwise the transmitting unit thinks that the packet could not reach its destination and tries to re-transmit the packet.

In FIG. 2, as in the other diagrams in this patent application illustrating the information travel, the time axis extends from top to bottom, in other words, the events which are higher up occur before those events which are below them.

When the first transmission unit 12 has successfully transmitted the information packet 16 through the network 11 to the second unit 13 the second unit 13 tries to acknowledge that the packet 16 is received, by transmitting via the network 11 an acknowledgement signal 21 to the first unit 12. As was noted above when the reservation contest method is used, due to the packet collisions it may become necessary that the acknowledgement signal is transmitted many times before the first unit receives the acknowledgement. This means unnecessary consumption of resources both in the second unit 13 and in the network 11, compared to a situation where the acknowledgement signal 21 is conveyed to the first unit 12 by a single transmission.

FIG. 3 shows another prior art embodiment 30 for reserving transmission capacity in a transmission system. The embodiment is based on a resource management table maintained in the first transmission unit 12, where the available transmission capacity is allocated to different units on the basis of request provided by them. In FIG. 3 a message 16 is transmitted from the first unit 12 to the second unit 13. If the message is for instance a status inquiry or any such information which requires that a response message 33 be transmitted back to the first unit 12, then the second transmission unit 13 recognizes the need for a response message when it processes the received packet 16.

The second transmission unit 13 transmits a capacity request 31 to the first unit 12 so that it is able to reserve the transmission capacity required to transmit the response message 33. Because the second unit 13 is not able to control the transmission resource in use, the reservation request 31 must by transmitted with the aid of the reservation contest method described above. The first unit 12 processes the capacity request 31 and updates the granted capacity in the resource distribution table. Then the first unit 12 transmits the information about the transmission capacity reserved for the transmission of the response message 33 with the aid of a grant message 32. The second unit 13 receives the grant message 32 and on the basis of the information contained in it the second unit transmits the response message 33 to the first unit 12 with the aid of the transmission capacity allocated to the second unit by the first unit 12.

As such the prior art solution 30 shown in FIG. 3 is more advanced than the system based on reservation contest presented in FIG. 2, but even the system 30 according to FIG. 3 utilizes the transmission capacity at a rather low efficiency, because also the transmission of the response message 33 requires the transmission of two other messages, i.a. the request and grant messages 31 and 32. Further the system according to the FIG. 3 is not able to eliminate the use of the reservation contest system completely, because the reservation request message 31 is still transmitted by the reservation contest system.

SUMMARY OF THE INVENTION

The object of this invention is to provide a new method and system with which the According to a first aspect of the invention, a method for reserving transmission capacity required by acknowledgement and/or response messages in a bi-directional transmission system, where a message is transmitted form a first unit to a second unit, a second unit receives the message transmitted by the first unit, and the second unit transmits an acknowledgement and/or response message as a response to the received message, is characterized in that a reservation of transmission capacity required by the acknowledgement and/or response message is made substantially in connection with transmission of the message transmitted from the first unit to the second unit.

Further in accord with the first aspect of the invention, the reservation of the transmission capacity required by the acknowledgement and/or response message is made before said message is transmitted from the first unit to the second unit.

Still further according to the first aspect of the invention, the reservation of the transmission capacity required by the acknowledgement and/or response message is made simultaneously when said message is transmitted from the first unit to the second unit.

Still further according to the first aspect of the invention, the reservation of the transmission capacity required by the acknowledgement and/or response message is made after said message has been transmitted from the first unit to the second unit.

Further still in accordance with the first aspect of the invention, the bi-directional transmission system utilizes the TCP transmission protocol.

Still further in accordance with the first aspect of the invention, the second unit transmit an acknowledgement and/or response message to the first unit.

Yet further in accordance with the first aspect of the invention, in addition to the first unit and the second unit, the transmission system contains at least a third unit, wherein the second unit transmits the acknowledgement and/or response message to the third unit.

Further in accordance with the first aspect of the invention, the bi-directional transmission system is a cable television system or a wireless point-to-multipoint system.

According to a second aspect of the invention, a system for reserving transmission capacity required by the acknowledgement and/or response messages in a bi-directional transmission system, wherein the system comprises at least a first unit for transmitting and receiving a message, a second unit having means for transmitting acknowledgement and/or response messages, is characterized in that the first unit or the second unit has means for reserving the transmission capacity required by the acknowledgement and/or response message substantially in connection with the transmission of a message transmitted from the first unit to the second unit.

Further in accord with the second aspect of the invention, the bi-directional transmission system is a cable television system or a wireless point-to-multipoint system.

With the solution according to the invention the available transmission capacity can be better utilized than in a prior art reservation contest method, as the re-transmission caused by packet collisions are avoided.

With the solution according to the invention it is further possible to reduce the communication between different units, for instance compared to cases according to the FIG. 3, where the unit which transmits a response packet must reserve the transmission capacity required for the response via a separate request operation. The solution according to the invention requires no corresponding request operation, whereby the transmission capacity required by the request operation becomes available to the actual data transmission. At the same time also the use of the reservation contest method required by the request message is avoided.

The solution according to the invention can be realized by software changes, and thus it will not essentially increase the manufacturing costs of the used system.

BRIEF DESCRIPTION OF THE DRAWINGS

Below the invention is described in detail with reference to the enclosed drawings, in which.

DETAILED DESCRIPTION OF THE PREFERRED EMBODIMENT

Figure 1A:
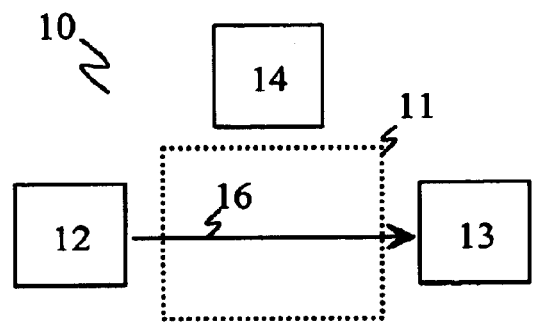
FIG. 1a shows a prior art system based on a reservation contest system with packets being conveyed from a first unit to second unit.
Figure 1B:
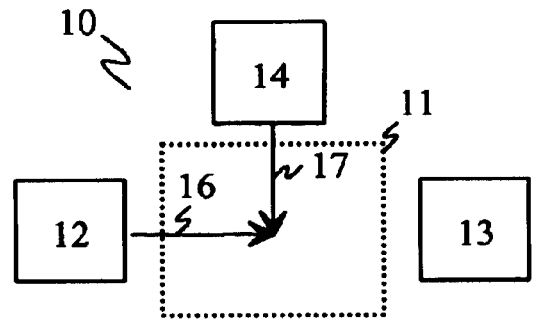
FIG. 1b shows a prior art system based on a reservation contest system with packets being conveyed from a first unit to a second unit.
Figure 2:
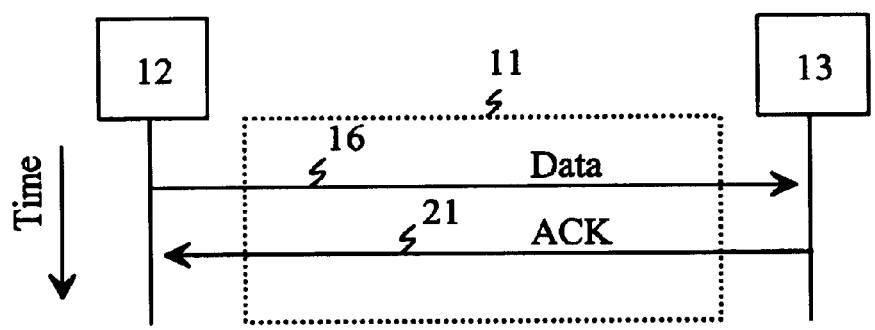
FIG. 2 shows how messages travel in a prior art system.
Figure 3:
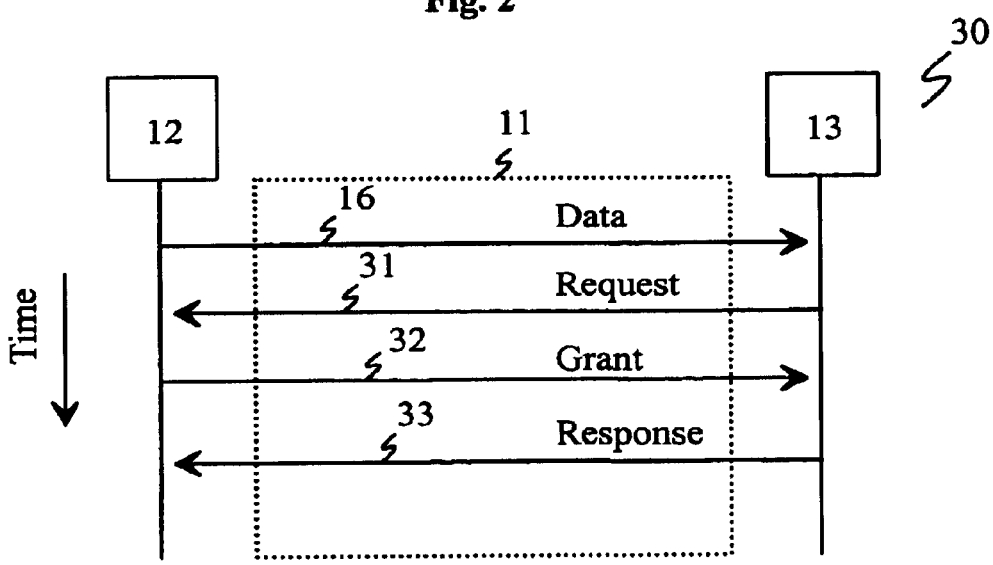
FIG. 3 shows how messages travel in another prior art system.

FIGS. 1, 2 and 3 were treated above in connection with the description of the prior art.

Figure 4:
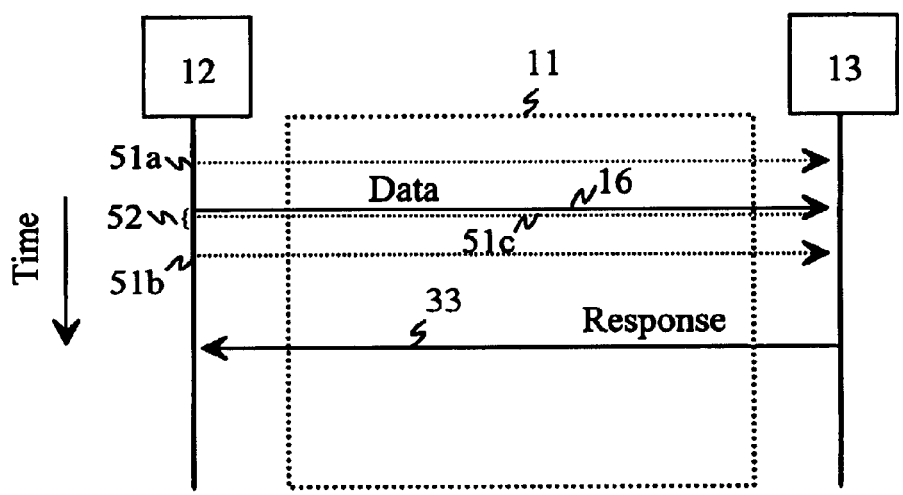
FIG. 4 shows how messages travel in a transmission system according to the invention.

FIG. 4 shows a solution according to the invention for transmitting acknowledgement and/or response information in bi-directional transmission systems. In the solution, when the first transmission unit 12 transmits to the second transmission unit 13 a message 16 via the network 11 it also transmits a message 51a, 51b, 51c about the reserved transmission capacity required to transmit the acknowledge message 33 required by the message 16. The message 51a, 51b, 51c concerning the reserved transmission capacity is advantageously transmitted in connection with the transmission of the message 16, either before 51a the message 16 containing the payload information or after it 51b. When desired the reservation message 51c and the message 16 can be combined into a single message 52 transmitted to the second unit 13.

In order to reserve the required transmission resource the message 16 is preferably identified so that it is possible to estimate the transmission capacity required by the acknowledgement or response message 33, and so that the reserved transmission resource is correctly dimensioned. If the transmitted message 16 requires for instance only an acknowledge it is then advantageous to reserve less transmission capacity than if the presumed response message would contain a larger amount of information.

However, if the reserved transmission resource is not sufficient, then the second unit 13 transmits in the transmission capacity reserved for the response only a part of the response information and includes there a request for extra resources in order to transmit the rest of the information.

When the transmission capacity of the acknowledgement or reservation message 33 required by the transmitted message 16 is reserved automatically before the message 16 is transmitted to the second unit 13 and when information about the transmission capacity reserved for the acknowledgement or reservation message is transmitted in connection with the transmission of the message 16 there is obtained an efficient utilization of the transmission capacity, because then the packet collisions caused by the reservation contest system are avoided, whereby the transmission resource can be utilized with a higher efficiency. Further, in a system according to FIG. 3, is possible with the aid of the invention to transmit a response message 33 without any separate request message 31 transmitted by the reservation contest method.

Figure 5:
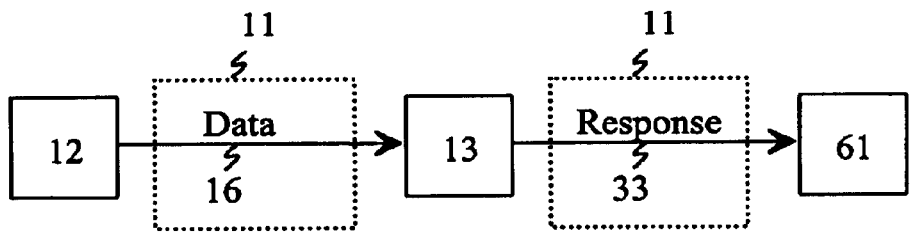
FIG. 5 shows how messages travel in another transmission system according to the invention.

The solution according to the invention is not limited to only such cases where the acknowledgement or response message is transmitted back the first unit 12. If it is possible with the aid of the first unit 12 to reserve transmission resources between the first and second transmission units 12 and 13 and also other resources, then a solution like that presented in FIG. 5 can be realized, where the second transmission unit 13 conveys the acknowledgement or response message to a third transmission unit 61. The transmission system can also contain a plurality of first and second transmission units.

Figure 6A:
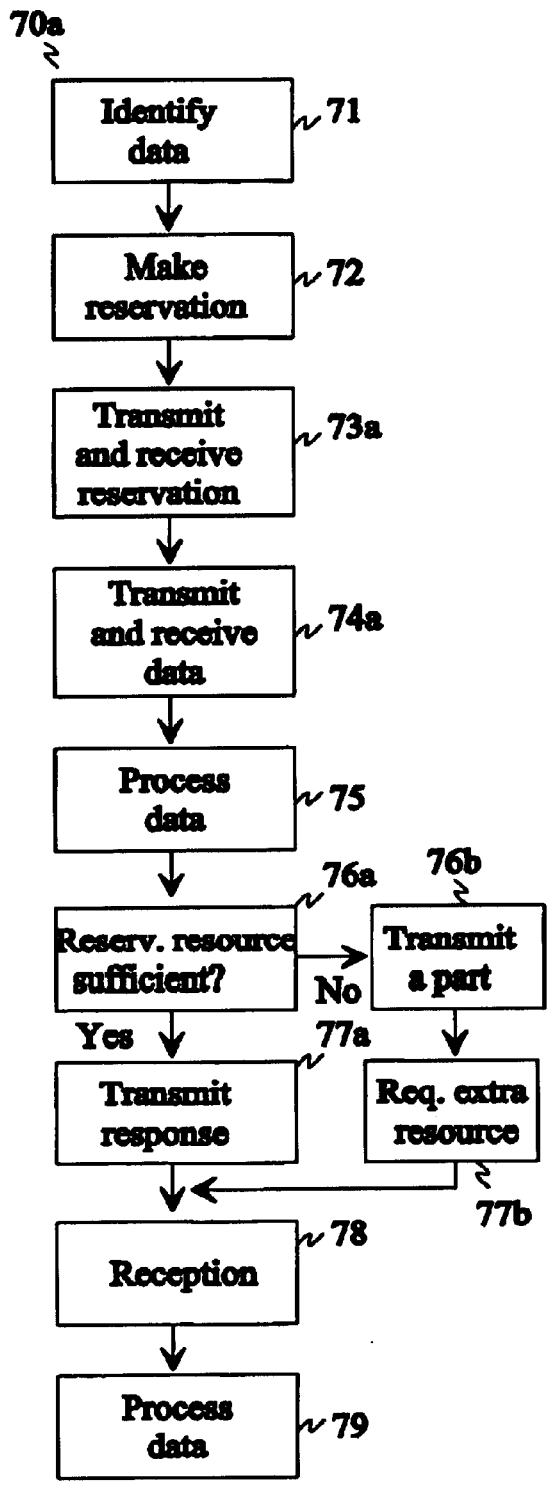
FIG. 6a shows block diagrams of some system embodiments according to the invention with reservation transmitted before data.
Figure 6B:
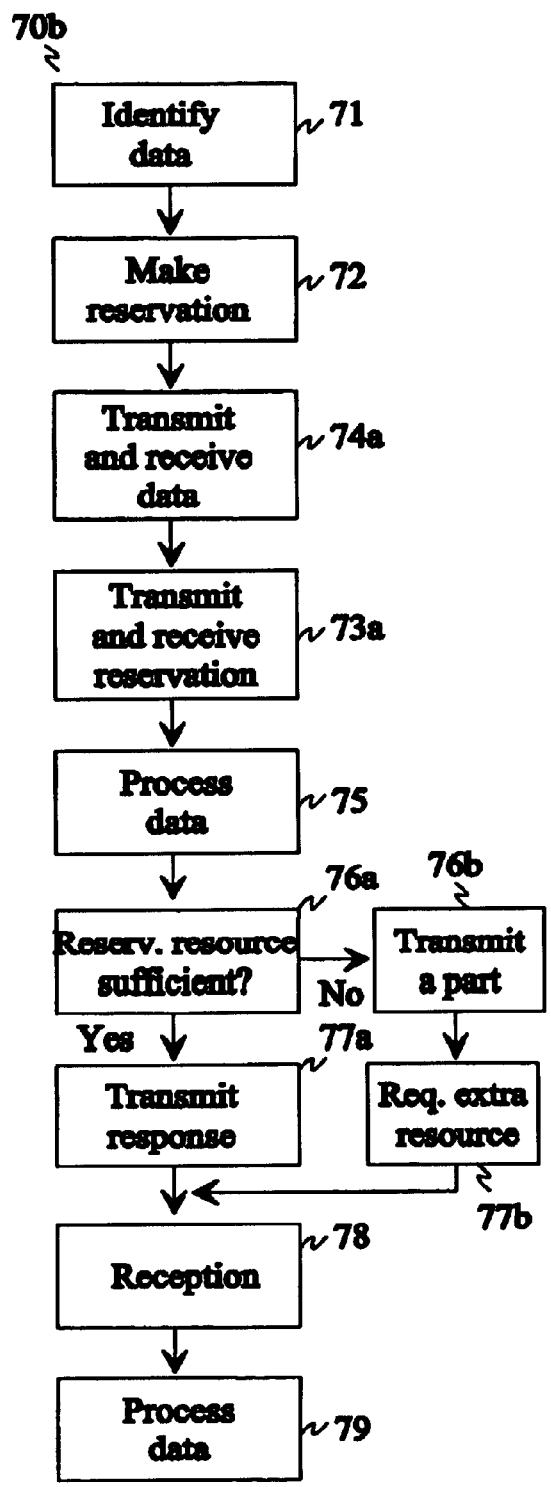
FIG. 6b shows block diagrams of a system embodiment according to the invention with reservation transmitted after data.
Figure 6C:
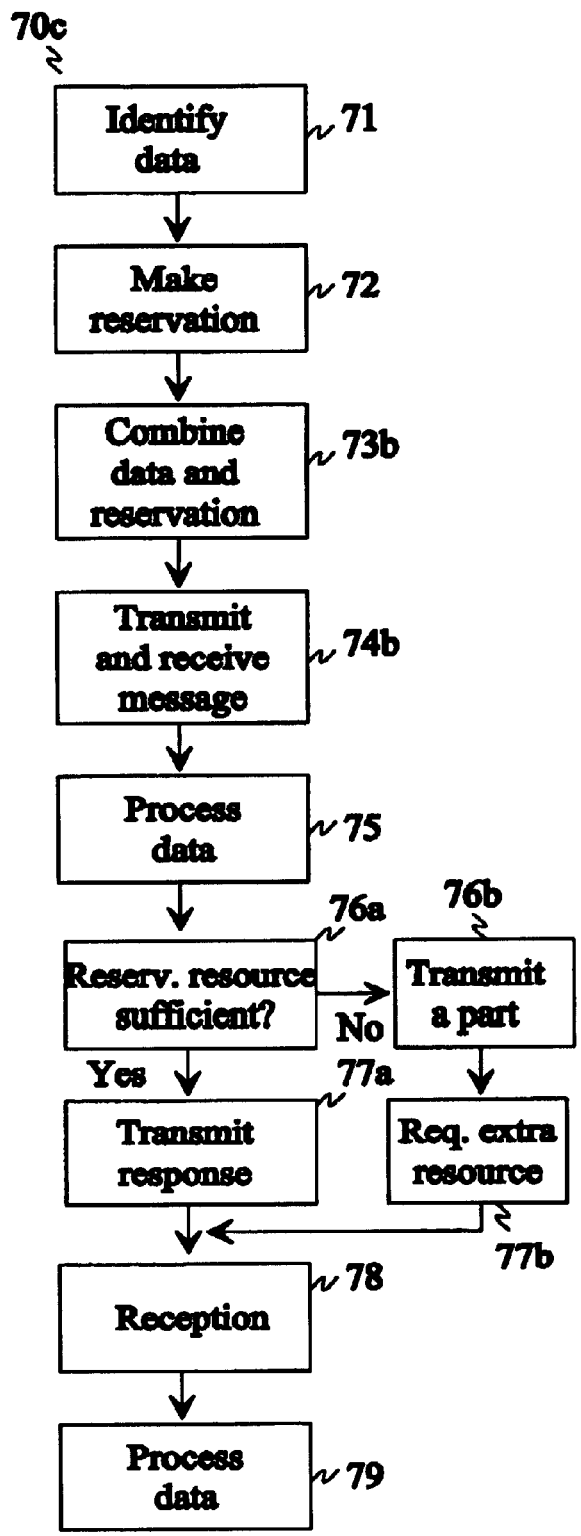
FIG. 6c shows block diagrams of a system embodiment according to the invention reservation and data transmitted together.

The FIGS. 6a, 6b and 6c show in flow diagrams three embodiments 70a, 70b and 70c of the method according to the invention. The first step 71 of the first embodiment 70a shown in FIG. 6a identifies the transmitted information is and estimates the transmission capacity required by the acknowledgement or response message. The second step 72 reserves the transmission capacity required by the supposed acknowledgement or response message. The third step 73a of the first embodiment 70a transmits the information about the transmission capacity reserved for the acknowledgement or response message from the first transmission unit to the second transmission unit. In the fourth step 74a of the first embodiment 70a the message containing the payload information is transmitted from the first unit to the second unit. In the fifth step 75 of the embodiment the second unit which received the message processes the information contained in the message and prepares the acknowledgement or response information required by the message. In the sixth step 76a the second transmission unit checks whether the reserved transmission capacity is sufficient for the transmission of the desired acknowledgement or response information.

If the reserved capacity is insufficient the second unit can transmit only a part of the information in the next step 76b and request in step 77b extra capacity for transmitting the rest of the information. If the reserved capacity is sufficient for transmitting the desired message the seventh step 77a of the embodiment transmits an acknowledgement or response message. In the eighth step 78 of the embodiment the first transmission unit receives the message transmitted by the second transmission unit, and in the ninth step 79 of the method the first transmission unit processes the received message and on the basis of this information it performs any required operations, such as reservation of extra capacity if the response message contained a request for extra capacity.

FIG. 6b shows another embodiment 70b of the method according to the invention which differs from the first embodiment 70a shown in FIG. 6a only regarding the processing order of the third and fourth steps 73b and 74b. In the second embodiment 70b the message containing the payload information is transmitted first, and the message containing information of the reserved capacity is transmitted only after that.

The third embodiment 70c according to the FIG. 6c differs from the above-presented first embodiment 70a only regarding the third and fourth steps 73b and 74b. The third step 73b of the third embodiment 70c combines the information about the transmission capacity reserved for the acknowledgement or response message with the payload information into a combined message, which in the fourth step 74b of the embodiment 70c is transmitted to the second transmission unit. Then both the payload information and the information about the transmission resource reserved for the acknowledgement or response are transmitted substantially simultaneously from the first transmission unit to the second transmission unit.

Figure 7:
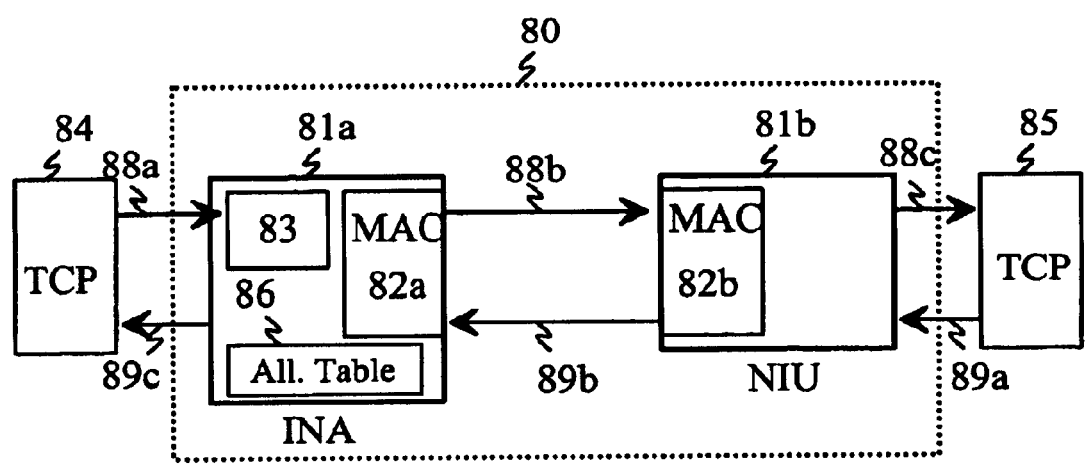
FIG. 7 shows a solution according to the invention for the management of a cable television or corresponding transmission channel.

FIG. 7 shows an embodiment 80 of the system according to the invention where the solution according to the invention uses the return channel of a cable television system or a point-to-multipoint system for reserving transmission capacity. The system 80 comprises an Interactive Network Adapter (INA) 81a and a Network Interface Unit (NIU) 81b. The network adapter 81a receives a message 88a from the TCP stack 84 and identifies the information contained in the message and estimates with the aid of the information estimating means 83 the transmission capacity required by any acknowledgement or response message. Then the network adapter 81a reserves the estimated transmission capacity with the aid of the resource management means 86.

The network adapter 81a transmits the information it gets from the TCP stack 84 with the aid of the Medium Access Control (MAC) means 82a as a message 88b to the network interface unit 81b, where corresponding MAC means 82b receives the message 88b. According to the invention the message 88b can contain a combination of the transmitted payload information and the information about the reserved transmission capacity, as was presented in the description of FIG. 6c above, or the message 88b can contain separate information 16 and reservation 51a, 51b messages according to FIG. 4.

The network interface unit 81b processes the received information and transmit it in a message 88c to a second TCP stack 85 to be transmitted further. The second TCP stack 85 transmits the response message 89a to the network interface unit 81b. In the simplest case the response message 89a can for instance be an acknowledgement signal according to the TCP standard. The network interface unit 81b processes the received response message 89a and transmits it as a message 89b to the MAC means 82a in the network adapter 81a, whereby the message 89b is transmitted through the transmission capacity allocated to that purpose according to the information which the network interface unit 81b obtained in the message 88b. If the received message 88b does not contain for instance a request for extra resources or any other information which is essential regarding the network adapter 81a, then the network adapter 81a transmits the information further to the TCP stack 84 for further transmission.

If the transmitted information relates only to the communication between the network adapter 81a and the network interface unit 81b, then no information communication with the TCP stacks 84 and 85 is required. An example of such a case is a status inquiry sent by the network adapter 81a to the network interface unit 81b, as the network interface unit 81b is itself able to answer that.

The solution according to the invention is not limited only to the above-presented examples, but the solution according to the invention can vary within the scope defined in the claims. Particularly, the solution according to the invention is not limited only to the transmission resource management of a cable television system presented above, but it also covers other solutions based on timed division multiple access having a centralized management of a bi-directional transmission resource.

What is claimed is:

1. A method for reserving transmission capacity required by an acknowledgement or response in a bi-directional transmission system, where a message is transmitted from a first unit to a second unit, the second unit receives the message transmitted by the first unit, and the second unit transmits the acknowledgement or response as a response to the received message, characterized in that in the first unit the message is identified and a transmission capacity required by the acknowledgement or response is estimated in advance of the acknowledgement or response;

the transmission capacity is dimensioned according to the estimation and reserved; and information about the transmission capacity reserved for the acknowledgement or response message is transmitted to the second unit before the second unit transmits the acknowledgement or response.

2. A method according to claim 1, characterized in that said reservation of the transmission capacity required by the acknowledgement and/or response message is made before said message is transmitted.

3. A method according to claim 1, characterized in that said reservation of the transmission capacity required by the acknowledgement and/or response message is made simultaneously when said message is transmitted from the first unit to the second unit.

4. A method according to claim 1, characterized in that said reservation of the transmission capacity required by the acknowledgement and/or response message is made after said message has been transmitted from the first unit to the second unit.

5. A method according to any previous claim, characterized in that said bi-directional transmission system utilizes the TCP transmission protocol.

6. A method according to claim 1 where the transmission system in addition to the first unit and the second unit contains at least a third unit, characterized in that the second unit transmits the acknowledgement and/or response message to the third unit.

7. A method according to claim 1, characterized in that said bi-directional transmission system is a cable television system or a wireless point-to-multipoint system.

8. A system for reserving transmission capacity required by an acknowledgement and/or response message in a bi-directional transmission system, wherein the system comprises at least:

a first unit for transmitting and receiving a message; and a second unit having means for receiving a message and for transmitting acknowledgement and/or response messages, characterized in that the system further comprises in the first unit:

means for identifying the message and estimating the transmission capacity required by the acknowledgement and/or response message;

a resource management means for reserving the estimated transmission capacity required by the acknowledgement and/or response message; and means for transmitting information about the transmission capacity reserved for the acknowledgement and/or response message to the second unit in connection with the transmission of the message.

9. A system according to claim 8, characterized in that said bi-directional transmission system is a cable television system or a wireless point-to-multipoint system.

10. A first unit for transmitting and receiving a message in a system for reserving transmission capacity required by an acknowledgement and/or response message in a b-directional transmission system, wherein the first unit comprises:

means for identifying the message and estimating the transmission capacity required by the acknowledgement and/or response message;

a resource management means for reserving the estimated transmission capacity required by the acknowledgement and/or response message; and means for transmitting information about the transmission capacity reserved for the acknowledgement and/or response message to a second unit in connection with the transmission of the message.

* * * * *

UNITED STATES PATENT AND TRADEMARK OFFICE
CERTIFICATE OF CORRECTION

PATENT NO. : 6,831,894 B1
DATED : December 14, 2004
INVENTOR(S) : Kokkinen et al.

It is certified that error appears in the above-identified patent and that said Letters Patent is hereby corrected as shown below:

<u>Column 8,</u>
Line 31, please cancel "b-directional" and substitute -- bi-directional -- therefor.

Signed and Sealed this

Third Day of May, 2005

JON W. DUDAS
*Director of the United States Patent and Trademark Office*